Dec. 29, 1925.　　　　　　　　　　　　　　　　　　　　1,567,567
Q. A. BRACKETT
WIRELESS RECEIVING SYSTEM
Filed April 18, 1922
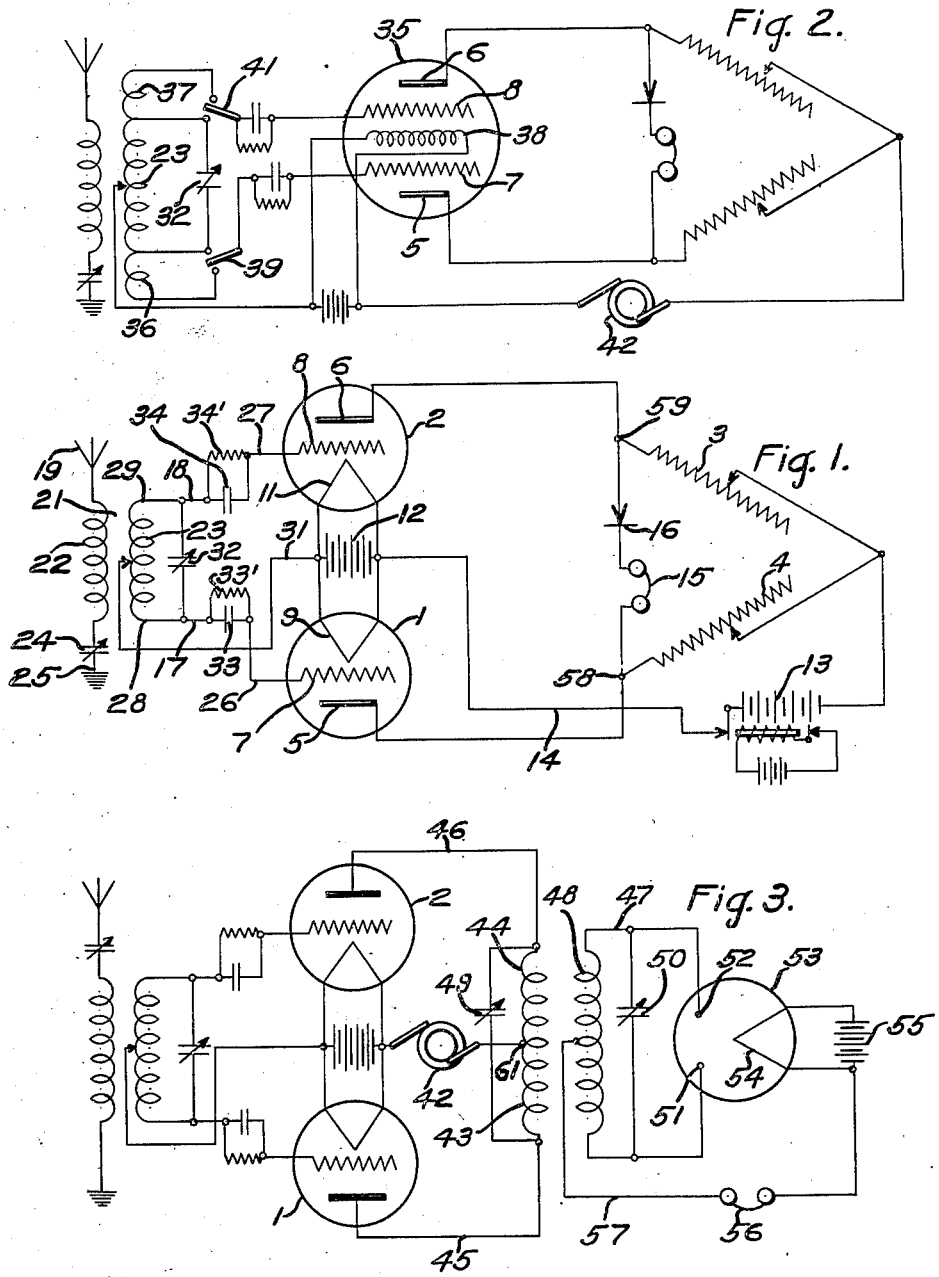
WITNESSES:
R. J. Butler.
H. L. Godfrey
INVENTOR
Quincy A. Brackett.
BY
Wesley G. Carr
ATTORNEY Patented Dec. 29, 1925.

1,567,567

UNITED STATES PATENT OFFICE.

QUINCY A. BRACKETT, OF SPRINGFIELD, MASSACHUSETTS, ASSIGNOR TO WESTINGHOUSE ELECTRIC & MANUFACTURING COMPANY, A CORPORATION OF PENNSYLVANIA.

WIRELESS RECEIVING SYSTEM.

Application filed April 18, 1922. Serial No. 555,279.

*To all whom it may concern:*

Be it known that I, QUINCY A. BRACKETT, a citizen of the United States, and a resident of Springfield, in the county of Hampden and State of Massachusetts, have invented a new and useful Improvement in Wireless Receiving Systems, of which the following is a specification.

My invention relates to wireless receiving systems and more especially to such systems as are adapted for continuous-wave reception.

One object of my invention is to provide a receiving system which admits of the reception of undamped signals, such, for example, as are radiated from arc transmitters, without employing the heterodyne or "beat" principle of operation.

Heretofore, in receiving systems responsive to signals from continuous-wave transmitters, it has been considered desirable, for the most efficient operation of such systems, to heterodyne the received signal impulses with locally generated currents of a slightly different frequency.

A disadvantage, however, of the present heterodyne receiving systems is the poor selectivity that may be obtained for signal impulses of relatively long wave lengths.

The undesirable characteristics of the present heterodyne receiving systems become of especial importance in the operation of long-distance wireless stations where the effect of interference may be such as to seriously impair the normal communication between such stations.

I have found, however, that, by employing a balanced circuit arrangement, as hereinafter described, a receiving system of unusual sensitivity and possessing a high degree of selectivity may be obtained wherein the usual heterodyning of the received energy is eliminated.

Briefly speaking, I accomplished the desired result, in one embodiment of my invention, by employing a balanced bridge arrangement wherein a source of audio-frequency currents is connected across one diagonal of the bridge, an indicating device is connected across an opposite diagonal thereof, a pair of triode valves are connected in individual arms of the bridge, and a source of signal impulses is oppositely associated with the control electrodes of said triode valves.

In another system, I accomplished the desired result by employing a balanced-circuit arrangement comprising a pair of thermionic valves, input and output circuits therefor, a source of signal impulses oppositely associated with the input circuits, a source of audio-frequency currents symmetrically associated with the output circuits, and a secondary circuit differentially associated with the latter circuits.

It will be noted that the system just mentioned is similar to the previous system in that operation is effected upon the unbalancing of the balanced circuits.

Other objects, as well as details of construction, whereby my invention may be utilized, will be apparent from the following description taken in connection with the accompanying drawings, in which:

Figure 1 is a diagrammatic view of circuits and apparatus embodying my invention;

Fig. 2 is a view similar to Fig. 1, but showing the functions of the two thermionic tubes consolidated into a single tube, and Fig. 3 is a diagrammatic view of circuits and apparatus embodying a modification of the system shown in Fig. 1.

In Fig. 1, I have shown a Wheatstone-bridge arrangement, individual arms of which comprise thermionic devices 1 and 2 and resistors 3 and 4. The thermionic devices 1 and 2 comprise, respectively, anode elements 5 and 6, grid elements 7 and 8, and hot-cathode elements 9 and 11 which may be energized from a common source of energy 12.

A source 13 of low-frequency variable currents which is shown as a buzzer arrangement of well known form, is connected across one diagonal of the bridge by a conductor 14 which extends from the source of energy 12 to a point common to the resistors 3 and 4. An indicating device 15 and a rectifying device 16 are included in a circuit which is connected across an opposite diagonal of the bridge.

The bridge may be unbalanced by means of a source of radio-frequency currents which is oppositely associated with input circuits 17 and 18 of the vacuum-tube devices 1 and 2. The source of radio-frequency currents just mentioned comprises an antenna 19, a coupling transformer 21 having a primary winding 22 and a secondary winding 23, a variable condenser 24 and a ground lead 25. The input or grid-filament circuits 17 and 18 comprise, respectively, conductors 26 and 27, which connect the grids 7 and 8 to opposite terminals of the secondary winding 23, portions 28 and 29 of the secondary winding 23, and a common conductor 31 which extends from an intermediate point on the coupling coil 23 to a point common to the hot cathodes 9 and 11. Opposite ends of the secondary winding 23 may be shunted by a condenser 32 for tuning purposes. The conductors 26 and 27 may have serially included in circuit therewith condensers 33 and 34, which are shunted by grid leaks 33' and 34', respectively.

Referring to Fig. 2, the arrangement herein shown differs from that of Fig. 1 in combining the functions of the thermionic tubes 1 and 2 into a single tube 35 and also in employing a pair of amplifying inductances 36 and 37. In the modification just mentioned, a single hot cathode 38 functions as a source of electron emission for the plates 5 and 6 respectively, the grids 7 and 8 being disposed, as usual, in the space-current path between their respective anodes and the hot cathode 38. The amplifying inductances serve to amplify the potentials applied to the grid, and may be connected, as shown, to opposite ends of the secondary winding 23 and rendered effective through switches 39 and 41, respectively. I have found that, though these inductances will amplify the potentials applied to the grids 7 and 8, they will not affect the tuning of the circuit comprising the secondary winding 23 and the variable condenser 32.

A still further modification embodied in the arrangement shown in Fig. 2 consists in the employment of an alternating-current generator 42 as a source of low-frequency currents.

The arrangement shown in Fig. 3 differs from that of Fig. 1 in the employment of coupling coils 43 and 44 in the output or plate-filament circuits 45 and 46 in place of the resistors 3 and 4, and also in the employment of an outgoing circuit 47 which is differentially associated with the coils 43 and 44 by means of a coil 48. A condenser 49 may be shunted across opposite terminals of the coils 43 and 44. In the secondary circuit 47, the coupling coil 48, which may be shunted by means of a condenser 50, has its opposite terminals connected, respectively, to two anodes 51 and 52 of a vacuum-tube device 53. The latter device comprises the pair of anodes 51 and 52 and a filament 54 which may be energized by means of a source of energy 55. An indicating device 56 is included in a circuit 57 which extends from a midpoint of the coupling coil 48 to the hot cathode 54.

In the operation of the system shown in Fig. 1, upon the adjustment of the resistance of resistors 3 and 4 to such values that the bridge is in a balanced state, the points 58 and 59 of the diagonal containing the indicating device 15 will be of an equal potential, thereby causing no response in the indicating device.

When the antenna circuit receives signal impulses, however, opposite potentials are impressed upon the grids 7 and 8, which tend to increase the impedance of one tube and to decrease the impedance of the other, thereby unbalancing the bridge arrangement at frequencies corresponding to the radio-frequencies corresponding to the radio-frequency currents.

Assuming the audio-frequency source of energy 13 or 42 replaced by a direct-current source of energy, the potential of the points 58 and 59 would vary at frequencies corresponding to the radio-frequency of the received signal impulses. Thus, such an arrangement, with a direct-current source of energy connected across one of the diagonals of the bridge requires the usual means for detecting undamped signal impulses. I have found, however, that, by replacing the direct-current source of energy just mentioned by a source of energy of audible frequency, the amplitude of the varying potentials at the points 58 and 59 may be increased and decreased at an audible rate. With the bridge in an initially balanced state, such audio-frequency potential variations may be detected in the indicating device upon an unbalancing of the bridge by signal impulses.

The operation of the system shown in Fig. 2 is similar to that of Fig. 1, the modifications consisting merely in combining the function of the vacuum tubes 1 and 2 into a single tube and in employing the grid-amplifying inductances, all as hereinbefore described.

Referring to Fig. 3, it will be noted that, during that portion of the cycle of the audio-frequency electromotive-force, when the center point 61 of the coil 43—44 is negative, there is no current in the output or plate-filament circuits 45 and 46 of the vacuum tubes 1 and 2.

When the potential of the point 61 reverses, however, the currents in the output circuits 45 and 46 of the tubes 1 and 2, which traverse the coupling coils 43 and 44, respectively, are in opposite directions and, therefore, have a differential effect upon the coil 48. Thus, when the output circuits 45 and 46 are balanced, there is no resultant voltage in the winding 48 tending to cause currents to traverse the indicating device 56.

Upon receipt of a signal, however, the impedance of one tube is reduced while that of the other is increased, thereby tending to cause an unbalance in the currents through the coupling coils 43 and 44. The currents, which are caused to traverse the oscillating circuit comprising the condenser 49 and the coil 48 by reason of the unbalancing of the plate-filament circuits 45 and 46, are currents of radio-frequency which increase in value from zero to a maximum during the portions of the cycle of the generator voltage when the plates of the vacuum tubes 1 and 2 are of a positive polarity. Such current variations may be detected by any means well known to the art, such, for example, as by a two-electrode tube and an indicating device suitably connected to the circuit.

In the drawing, however, I have shown the double-anode tube 53 together with the indicating device 56 for detecting purposes, which arrangement has the advantage of giving a circuit which is balanced statically as well as magnetically. The condensers 49 and 50, which have been included merely for purposes of tuning, may or may not be employed.

The particular advantage of my invention resides in the provision of a receiving system for continuous-wave signals which admits of the elimination of the heterodyning feature of such systems.

While I have shown three embodiments of my invention, it is capable of various other modifications within the scope of the appended claims. I desire, therefore, that only such limitations shall be imposed thereon as are indicated in the appended claims taken in connection with the accompanying drawings and specification.

I claim as my invention:

1. In a radio receiving system, a Wheatstone bridge having signal-controlled impedances in two arms, a source of audio-frequency current in one diagonal and a detector and translating device in the other diagonal.

2. In a radio receiving system, a Wheatstone bridge having vacuum tubes in two adjacent arms, a source of audio-frequency current in the diagonal to the junction of said arm and a translating device and a rectifying device in series in the other diagonal.

3. In a radio receiving system, two vacuum tubes, each having a grid condenser and gridleak, a Wheatstone bridge having said vacuum tubes in adjacent arms and a rectifier in the diagonal across said arms.

4. In a radio receiving system, two vacuum tubes arranged symmetrically in a balanced network, signal-controlled means for depressing the average grid potential of both tubes together while varying the instantaneous grid potentials of said tubes oppositely, and means in said network including a rectifier for detecting the instantaneous differences of the grid potentials.

5. In a radio receiving system, an oscillating circuit, means for energizing said oscillating circuit from the incoming signal, two vacuum tubes, each having a cathode, a grid and an anode, grid condensers connecting the grids to points of opposite potential in said oscillating circuit, grid leaks about said condensers, a source of alternating potential connected to a point of said oscillating circuit substantially midway between said points of opposite potential, to said cathodes and to said anodes, and means energized from the connection to the anodes for delivering energy to a translating device, said means including a rectifier.

In testimony whereof, I have hereunto subscribed my name this 15th day of April, 1922.

QUINCY A. BRACKETT.